United States Patent
Zheng et al.

(10) Patent No.: US 11,082,697 B2
(45) Date of Patent: *Aug. 3, 2021

(54) METHODS AND APPARATUS FOR SIGNALING INTRA PREDICTION FOR LARGE BLOCKS FOR VIDEO ENCODERS AND DECODERS

(71) Applicant: InterDigital VC Holdings, Inc., Wilmington, DE (US)

(72) Inventors: Yunfei Zheng, San Jose, CA (US); Qian Xu, Folsom, CA (US); Xiaoan Lu, Yardley, PA (US); Peng Yin, Ithaca, NY (US); Joel Sole Rojals, San Diego, CA (US); Adeel Abbas, Passaic, NJ (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 426 days.

This patent is subject to a terminal disclaimer.

(21) Appl. No.: 15/806,893

(22) Filed: Nov. 8, 2017

(65) Prior Publication Data
US 2018/0070088 A1 Mar. 8, 2018

Related U.S. Application Data

(63) Continuation of application No. 13/381,538, filed as application No. PCT/US2010/001862 on Jun. 29, 2010, now abandoned.
(Continued)

(51) Int. Cl.
H04N 19/176 (2014.01)
H04N 19/70 (2014.01)
(Continued)

(52) U.S. Cl.
CPC ........... H04N 19/136 (2014.11); H04N 19/11 (2014.11); H04N 19/147 (2014.11);
(Continued)

(58) Field of Classification Search
None
See application file for complete search history.

(56) References Cited

U.S. PATENT DOCUMENTS

| 5,060,285 A | 10/1991 | Dixit et al. |
| 6,084,908 A | 7/2000 | Chiang et al. |

(Continued)

FOREIGN PATENT DOCUMENTS

| CN | 1513268 A | 7/2004 |
| CN | 1719905 A | 1/2006 |

(Continued)

OTHER PUBLICATIONS

Chen etal: VCEG AJ23: "Video coding using extended block sizes", ITU—Telecommunications Standardization Sector, Study Group 16 Question 6, Video Coding Experts Group (VCEG) 36th Meeting: San Diego, USA, Oct. 8-10, 2008.
(Continued)

*Primary Examiner* — Tyler W. Sullivan
(74) *Attorney, Agent, or Firm* — Condo Roccia Koptiw LLP

(57) ABSTRACT

Methods and apparatus are provided for signaling intra prediction for large blocks for video encoders and decoders. The intra prediction is signaled by selecting a basic coding unit size and assigning a single spatial intra partition type for the basic coding unit size. The single spatial intra partition type is selectable from among a plurality of spatial intra partition types. The at least one large block has a large block size greater than a block size of the basic coding unit. The intra prediction is hierarchical layer intra prediction and is
(Continued)

performed for the at least one large block by at least one of splitting from the large block size to the basic coding unit size and merging from the basic coding unit size to the large block size.

6 Claims, 9 Drawing Sheets

Related U.S. Application Data

(60) Provisional application No. 61/222,177, filed on Jul. 1, 2009.

(51) Int. Cl.
    *H04N 19/96* (2014.01)
    *H04N 19/11* (2014.01)
    *H04N 19/136* (2014.01)
    *H04N 19/147* (2014.01)
    *H04N 19/196* (2014.01)
    *H04N 19/463* (2014.01)

(52) U.S. Cl.
    CPC ......... *H04N 19/176* (2014.11); *H04N 19/196* (2014.11); *H04N 19/463* (2014.11); *H04N 19/70* (2014.11); *H04N 19/96* (2014.11)

(56) References Cited

U.S. PATENT DOCUMENTS

| | | | |
|---|---|---|---|
| 7,302,006 | B2 | 11/2007 | Apostolopoulos et al. |
| 8,467,450 | B2 | 6/2013 | Moriya et al. |
| 8,483,285 | B2 * | 7/2013 | Ye .................. H04N 19/122 375/240.24 |
| 9,113,168 | B2 * | 8/2015 | Park .................. H04N 19/176 |
| 9,288,494 | B2 | 3/2016 | Xu |
| 10,455,248 | B2 * | 10/2019 | Park .................. H04N 19/176 |
| 2003/0202602 | A1 | 10/2003 | Apostolopoulos et al. |
| 2004/0028282 | A1 | 2/2004 | Kato et al. |
| 2006/0013299 | A1 | 1/2006 | Sato et al. |
| 2006/0109913 | A1 | 5/2006 | Wang et al. |
| 2006/0251330 | A1 | 11/2006 | Toth et al. |
| 2007/0237228 | A1 | 10/2007 | Han et al. |
| 2008/0123947 | A1 | 5/2008 | Moriya et al. |
| 2008/0123977 | A1 | 5/2008 | Moriya et al. |
| 2008/0267291 | A1 | 10/2008 | Vieron et al. |
| 2009/0022221 | A1 | 1/2009 | Xie et al. |
| 2009/0046781 | A1 | 2/2009 | Moriya et al. |
| 2009/0060345 | A1 | 3/2009 | Wheeler et al. |
| 2009/0154567 | A1 | 6/2009 | Lei et al. |
| 2009/0232206 | A1 * | 9/2009 | Boon .................. H04N 19/46 375/240.12 |
| 2010/0086029 | A1 | 4/2010 | Chen et al. |
| 2010/0086032 | A1 | 4/2010 | Chen et al. |
| 2010/0208827 | A1 | 8/2010 | Divorra Escoda et al. |
| 2011/0286520 | A1 | 11/2011 | Xu et al. |
| 2011/0292999 | A1 | 12/2011 | Jeong et al. |
| 2012/0106629 | A1 * | 5/2012 | Zheng ................. H04N 19/196 375/240.02 |

FOREIGN PATENT DOCUMENTS

| | | |
|---|---|---|
| CN | 1722836 | 1/2006 |
| CN | 101001382 | 7/2007 |
| CN | 101047860 | 10/2007 |
| CN | 101150719 | 3/2008 |
| CN | 101207810 | 6/2008 |
| CN | 101273641 | 9/2008 |
| CN | 101340581 | 1/2009 |
| CN | 101394565 | 3/2009 |
| CN | 101467461 | 6/2009 |
| JP | 08280020 | 10/1996 |
| JP | 2004128749 | 4/2004 |
| JP | 2005519543 | 6/2005 |
| JP | 2007503784 | 2/2007 |
| JP | 2007528675 | 11/2007 |
| JP | 2009118233 | 5/2009 |
| KR | 20050026318 | 3/2005 |
| KR | 20090065401 | 6/2009 |
| KR | 102109244 B1 | 5/2020 |
| WO | WO03075579 | 9/2003 |
| WO | WO2004104930 | 12/2004 |
| WO | WO2005093661 | 10/2005 |
| WO | WO2006004331 | 1/2006 |
| WO | WO2007034918 | 3/2007 |
| WO | 2007081908 A1 | 7/2007 |
| WO | 2008004769 A1 | 1/2008 |
| WO | WO2008027192 | 3/2008 |
| WO | WO2008088140 | 7/2008 |
| WO | WO2009028922 | 3/2009 |
| WO | WO2009051719 | 4/2009 |
| WO | WO2010039731 | 4/2010 |

OTHER PUBLICATIONS

Yoshino etal: m16082 "preliminary response for draft call for evidence of high performance video coding", ISO/IEC JTC1/SC29/WG11, MPEG2008, Feb. 2009, Lausanne, Switzerland.

Im et al., "Enlarging MB Size for High Fidelity Video Coding Beyond HD", Itu—Telecommunications Standardization Sector, Document: VCEG-AJ21, 36th Meeting: San Diego, CA, Oct. 8-10, 2008.

Lim et al., "Intra Coding Using Extended Block Size", ITU—Telecommunications Standardization Sector, Document: VCEG-AL28, 38th Meeting: London, UK / Geneva, CH, Jul. 1-8, 2009, pp. 1-3.

Wien, Variable Block-Size Transforms for H.264/AVC, IEEE Transactions on Circuits and Systems for Video Technology, vol. 13, No. 7, Jul. 2003, pp. 604-613.

ITU-T H.264 Standard, International Telecommunication Union, Mar. 2005, 343 pages, Mar. 1, 2005.

Lee et al., "Technical Considerations for Ad Hoc Group on New Challenges in Video Coding Standardization", ISO/IEC JTC1/SC29/WG11, Hannover, Germany, Jul. 2008, four pages.

ITU COM 16-C 123-E Standard, "Vdeo Coding Using Extended Block Sizes", International Telecommunication Union, Jan. 2009, four pages.

"ITU-T Video Coding Experts Group (VCEG)", https://groups.yahoo.com/neo/groups/all/list, accessed Mar. 31, 2015, Jul. 1, 2009, 3 pages.

Marpe, et al., "H.264/MPEG4-AVC Fidelity Range Extensions: Tools, Profiles, Performance, and Application Areas", 0-7803-9134-9, IEEE International Conference on Image Processing, Genova, Italy, Sep. 14, 2005, 4 pages.

Naito, et al., "Efficient coding scheme for super high definition video based on extending H.264 high profile", Visual Communications and Image Processing 2006, SPI-IS&T/vol. 6077, 607727, 2006, pp. 1-8.

Vaisey, et al., "Image Compression with Variable Block Size Segmentation", IEEE Transactions on Signal Processing, vol. 40, No. 8, Aug. 8, 1992, pp. 2040-2060.

* cited by examiner

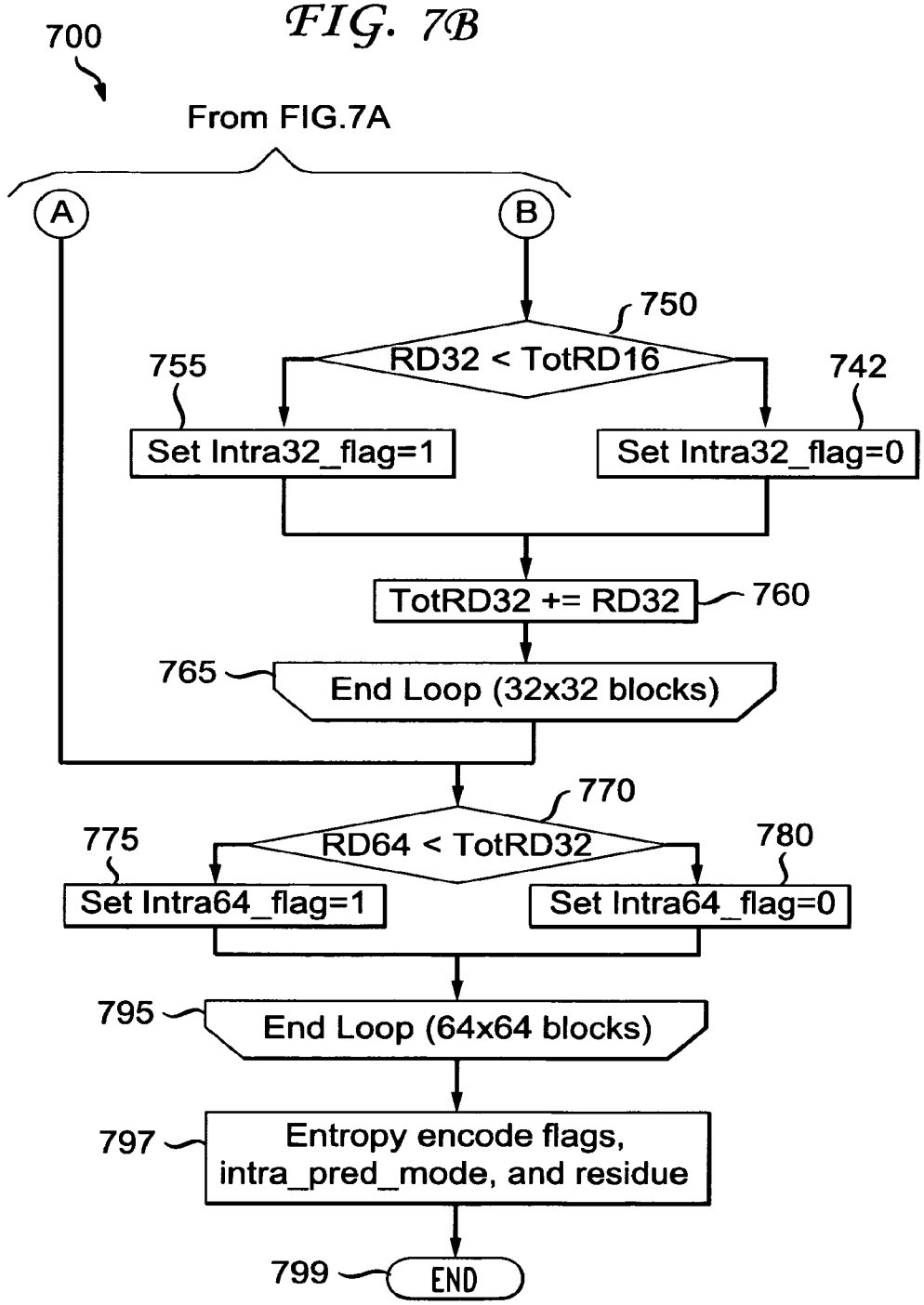

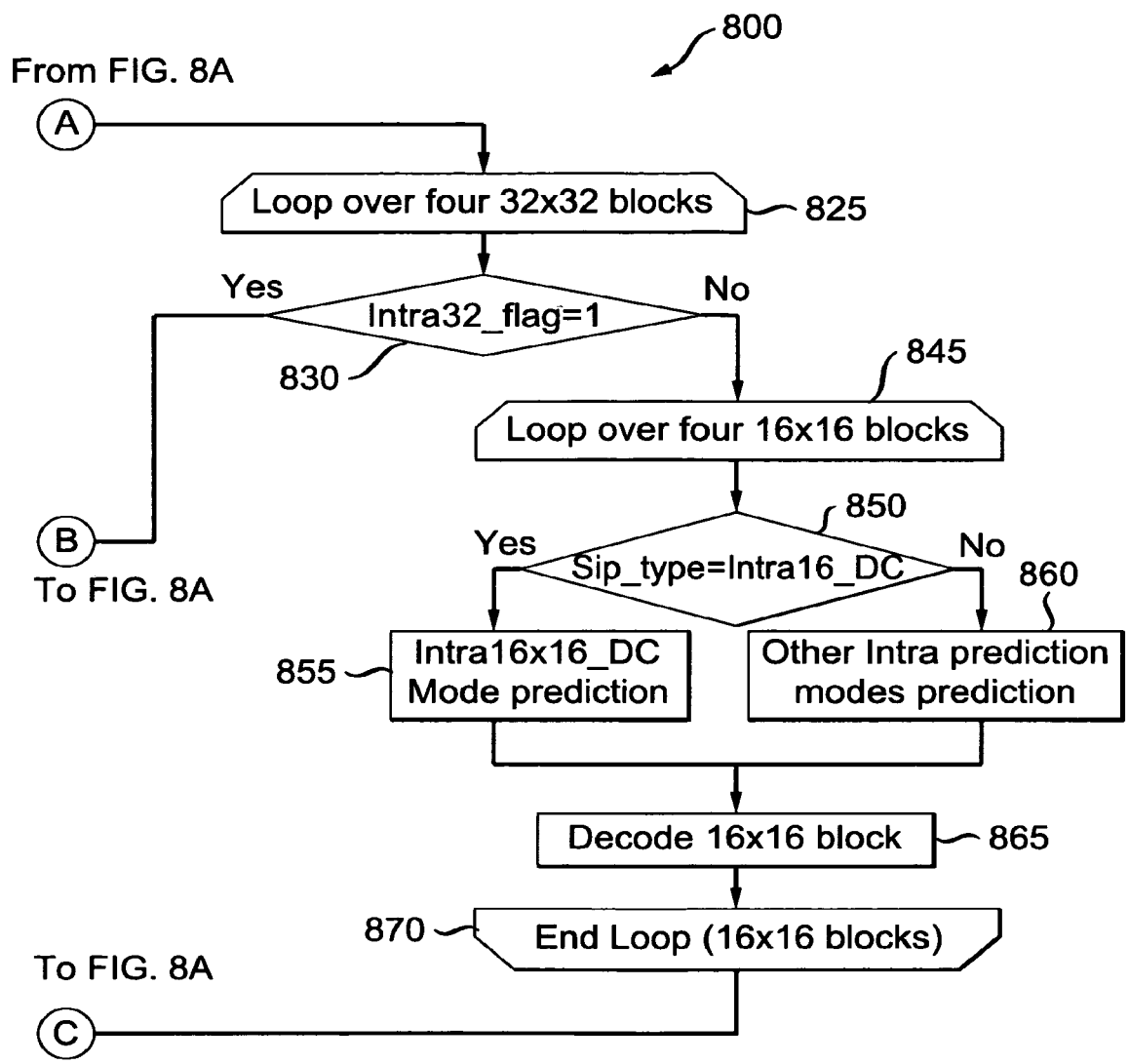

METHODS AND APPARATUS FOR SIGNALING INTRA PREDICTION FOR LARGE BLOCKS FOR VIDEO ENCODERS AND DECODERS

CROSS-REFERENCE TO RELATED APPLICATIONS

This application is a Continuation of co-pending U.S. application Ser. No. 13/381,538, filed Dec. 29, 2011, which is a National Phase entry under 35 U.S.C. § 371 of International Application No. PCT/US2010/001862, filed Jun. 29, 2010, which claims the benefit of U.S. Provisional Application Ser. No. 61/222,177, filed Jul. 1, 2009, which is incorporated by reference herein in its entirety.

TECHNICAL FIELD

The present principles relate generally to video encoding and decoding and, more particularly, to methods and apparatus for signaling intra prediction for large blocks for video encoders and decoders.

BACKGROUND

Most modern video coding standards employ various coding modes to efficiently reduce the correlations in the spatial and temporal domains. For example, in the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"), a picture can be intra or inter coded. In intra pictures, all macroblocks are coded in intra modes, thus exploiting spatial correlations within the picture. Intra modes can be classified into the following three types: INTRA4×4; INTRA8×8; and INTRA16×16. INTRA4×4 and INTRA8×8 support 9 intra prediction modes and INTRA16×16 supports 4 intra prediction modes.

INTRA4×4 and INTRA8×8 support the following 9 intra prediction modes: vertical; horizontal; DC; diagonal-down/left; diagonal-down/right; vertical-left; horizontal-down; vertical-right; and horizontal-up prediction. INTRA16×16 supports the following 4 intra prediction modes: vertical; horizontal; DC; and plane prediction. Turning to FIG. 1, INTRA4×4 and INTRA8×8 prediction modes are indicated generally by the reference numeral 100. In FIG. 1, the reference numeral 0 indicates a vertical prediction mode, the reference numeral 1 indicates a horizontal prediction mode, the reference numeral 3 indicates a diagonal-down/left prediction mode, the reference numeral 4 indicates a diagonal-down/right prediction mode, the reference numeral 5 indicates a vertical-right prediction mode, the reference numeral 6 indicates a horizontal-down prediction mode, the reference numeral 7 indicates a vertical-left prediction mode, and the reference numeral 8 indicates a horizontal-up prediction mode. DC mode, which is part of the INTRA4×4 and INTRA8×8 prediction modes, is not shown. Turning to FIG. 2, INTRA16×16 prediction modes are indicated generally by the reference numeral 200. In FIG. 2, the reference numeral 0 indicates a vertical prediction mode, the reference numeral 1 indicates a horizontal prediction mode, and the reference numeral 3 indicates a plane prediction mode. DC mode, which is part of the INTRA16×16 prediction modes, is not shown.

INTRA4×4 uses a 4×4 discrete cosine transform (DCT). INTRA8×8 uses 8×8 transforms. INTRA16×16 uses cascaded 4×4 transforms. For the signaling, INTRA4×4 and INTRA8×8 share the same macroblock type (mb_type) 0 and are differentiated by a transform size flag (transform_8×8_size_flag). Then the choice of intra prediction mode in INTRA4×4 or INTRA8×8 is signaled by the most probable mode possibly with a remaining mode if necessary. For INTRA16×16, all the intra prediction modes along with a coded block pattern (cbp) type are signaled in mb_type, which uses an mb_type value from 1 to 24. TABLE 1 shows the detailed signaling for macroblock types for Intra coded slices (I slices). If a larger block size than 16×16 is used for intra prediction, then several possible issues are faced, as follows.

(1) If INTRA32×32 or INTRA64×64 prediction are added, by simply extending the mb_type in the MPEG-4 AVC Standard, it will cause too much overhead for those two new modes and, in addition, will not allow a hierarchical type of intra prediction. An example of a hierarchical type of intra prediction is explained as follows. If a 32×32 block is used as a large block and we allow sub-partitions to be 16×16 then, for each 16×16 sub-partition, INTRA4×4, INTRA8×8, INTRA16×16 should be allowed.

(2) If a larger transform (such as a 16×16 transform) instead of a cascaded transform is used for INTRA16×16, then the current signaling cannot be applied.

(3) We should give different priority for intra prediction modes inside one intra partition type.

TABLE 1

| mb_type | Name of mb_type | transform_size_8×8_flag | MbPartPredMode (mb_type, 0) | Intra16×16-PredMode | CodedBlock-PatternChroma | CodedBlock-PatternLuma |
| --- | --- | --- | --- | --- | --- | --- |
| 0 | I_N×N | 0 | Intra_4×4 | na | Equation 7-33 | Equation 7-33 |
| 0 | I_N×N | 1 | Intra_8×8 | na | Equation 7-33 | Equation 7-33 |
| 1 | I_16×16_0_0_0 | na | Intra_16×16 | 0 | 0 | 0 |
| 2 | I_16×16_1_0_0 | na | Intra_16×16 | 1 | 0 | 0 |
| 3 | I_16×16_2_0_0 | na | Intra_16×16 | 2 | 0 | 0 |
| 4 | I_16×16_3_0_0 | na | Intra_16×16 | 3 | 0 | 0 |
| 5 | I_16×16_0_1_0 | na | Intra_16×16 | 0 | 1 | 0 |
| 6 | I_16×16_1_1_0 | na | Intra_16×16 | 1 | 1 | 0 |
| 7 | I_16×16_2_1_0 | na | Intra_16×16 | 2 | 1 | 0 |
| 8 | I_16×16_3_1_0 | na | Intra_16×16 | 3 | 1 | 0 |
| 9 | I_16×16_0_2_0 | na | Intra_16×16 | 0 | 2 | 0 |
| 10 | I_16×16_1_2_0 | na | Intra_16×16 | 1 | 2 | 0 |
| 11 | I_16×16_2_2_0 | na | Intra_16×16 | 2 | 2 | 0 |
| 12 | I_16×16_3_2_0 | na | Intra_16×16 | 3 | 2 | 0 |
| 13 | I_16×16_0_0_1 | na | Intra_16×16 | 0 | 0 | 15 |
| 14 | I_16×16_1_0_1 | na | Intra_16×16 | 1 | 0 | 15 |

TABLE 1-continued

| mb_type | Name of mb_type | transform_size_8×8_flag | MbPartPredMode (mb_type, 0) | Intra16×16-PredMode | CodedBlock-PatternChroma | CodedBlock-PatternLuma |
|---|---|---|---|---|---|---|
| 15 | I_16×16_2_0_1 | na | Intra_16×16 | 2 | 0 | 15 |
| 16 | I_16×16_3_0_1 | na | Intra_16×16 | 3 | 0 | 15 |
| 17 | I_16×16_0_1_1 | na | Intra_16×16 | 0 | 1 | 15 |
| 18 | I_16×16_1_1_1 | na | Intra_16×16 | 1 | 1 | 15 |
| 19 | I_16×16_2_1_1 | na | Intra_16×16 | 2 | 1 | 15 |
| 20 | I_16×16_3_1_1 | na | Intra_16×16 | 3 | 1 | 15 |
| 21 | I_16×16_0_2_1 | na | Intra_16×16 | 0 | 2 | 15 |
| 22 | I_16×16_1_2_1 | na | Intra_16×16 | 1 | 2 | 15 |
| 23 | I_16×16_2_2_1 | na | Intra_16×16 | 2 | 2 | 15 |
| 24 | I_16×16_3_2_1 | na | Intra_16×16 | 3 | 2 | 15 |
| 25 | I_PCM | na | na | na | na | na |

Some prior art approaches exist relating to signaling large motion (inter) partitions in extensions of the MPEG-4 AVC Standard. One example of how large motion (Inter) partitions are signaled in extensions of the MPEG-4 AVC Standard is described with respect to a first prior art approach. The first prior art approach describes how signaling is done for 32×32 blocks or 64×64 blocks using a hierarchical coding structure.

Moreover, in addition to the existing motion partition sizes (16×16, 16×8, 8×16, 8×8, 8×4, 4×8 and 4×4) in the MPEG-4 AVC Standard, inter coding has also been proposed for an extension of the MPEG-4 AVC Standard using 32×32, 32×16, and 16×32 partitions. Turning to FIG. 3, motion partitions for use in 32×32 blocks are indicated generally by the reference numeral 300. The partitions include 32×32, 32×16, 16×32, and 16×16. 16×16 partitions can be further partitioned into partitions of sizes 16×16, 16×8, 8×16, and 8×8. Moreover, 8×8 partitions can be further partitioned into partitions of sizes 8×8, 8×4, 4×8, and 4×4.

For each 32×32 block, SKIP mode or DIRECT mode is signaled using an mb32_skip_flag in a way similar to that performed for other modes of the MPEG-4 AVC Standard. In addition, the original mb_type for an M×N (M=8, or 16 and N=8, or 16) partition in the MPEG-4 AVC Standard is also used to signal a 2M×2N partition in a 32×32 block. If the mb32_type of a 32×32 indicates that a 16×16 partition is used, then the four 16×16 blocks are signaled in raster scan order by using the same syntax elements as macroblock_layer( ) in the MPEG-4 AVC Standard. Each 16×16 block may be partitioned further in the quadtree manner, from size 16×16 down to size 4×4.

For macroblock size 64×64, the following partitions are added above the partitions used in 32×32 blocks: 64×64; 64×32; and 32×64. Thus, one more hierarchical layer is added in the macroblock partition above block size 32×32. The original mb_type for an M×N (M=8, or 16 and N=8, or 16) macroblock partition in the MPEG-4 AVC Standard is used to signal a 4M×4N macroblock partition in 64×64 macroblocks. If a 32×32 macroblock partition is used for a 64×64 block, then each 32×32 block will be handled in the same manner as described above.

However, the existing literature does not address how large intra mode is signaled, where large intra mode is defined to mean intra prediction involving partition blocks having a size equal to or larger than 32×32.

SUMMARY

These and other drawbacks and disadvantages of the prior art are addressed by the present principles, which are directed to methods and apparatus for signaling intra prediction for large blocks for video encoders and decoders.

According to an aspect of the present principles, an apparatus is provided. The apparatus includes a video encoder for encoding picture data for at least one large block in a picture by signaling intra prediction for the at least one large block. The intra prediction is signaled by selecting a basic coding unit size and assigning a single spatial intra partition type for the basic coding unit size. The single spatial intra partition type is selectable from among a plurality of spatial intra partition types. The at least one large block has a large block size greater than a block size of the basic coding unit. The intra prediction is hierarchical layer intra prediction and is performed for the at least one large block by at least one of splitting from the large block size to the basic coding unit size and merging from the basic coding unit size to the large block size.

According to another aspect of the present principles, a method in a video encoder is provided. The method includes encoding picture data for at least one large block in a picture by signaling intra prediction for the at least one large block. The intra prediction is signaled by selecting a basic coding unit size and assigning a single spatial intra partition type for the basic coding unit size. The single spatial intra partition type is selectable from among a plurality of spatial intra partition types. The at least one large block has a large block size greater than a block size of the basic coding unit. The intra prediction is hierarchical layer intra prediction and is performed for the at least one large block by at least one of splitting from the large block size to the basic coding unit size and merging from the basic coding unit size to the large block size.

According to yet another aspect of the present principles, an apparatus is provided. The apparatus includes a video decoder for decoding picture data for at least one large block in a picture by determining that intra prediction is to be performed for the at least one large block. The intra prediction is determined by determining a basic coding unit size and determining a single spatial intra partition type for the basic coding unit size. The single spatial intra partition type is determinable from among a plurality of spatial intra partition types. The at least one large block has a large block size greater than a block size of the basic coding unit. The intra prediction is hierarchical layer intra prediction and is performed for the at least one large block by at least one of splitting from the large block size to the basic coding unit size and merging from the basic coding unit size to the large block size.

According to still another aspect of the present principles, a method is provided in a video decoder. The method includes decoding picture data for at least one large block in a picture by determining that intra prediction is to be performed for the at least one large block. The intra prediction is determined by determining a basic coding unit size and determining a single spatial intra partition type for the basic coding unit size. The single spatial intra partition type is determinable from among a plurality of spatial intra partition types. The at least one large block has a large block size greater than a block size of the basic coding unit. The intra prediction is hierarchical layer intra prediction and is performed for the at least one large block by at least one of splitting from the large block size to the basic coding unit size and merging from the basic coding unit size to the large block size.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIGS. 7A and 7B represent a flow diagram for an exemplary method for encoding picture data for large blocks by signaling intra prediction for the large blocks in accordance with an embodiment of the present principles; and FIGS. 8A and 8B represent a flow diagram showing an exemplary method for decoding picture data for large blocks by determining that intra prediction is to be applied to the large blocks in accordance with an embodiment of the present principles.

DETAILED DESCRIPTION

Figure 1:
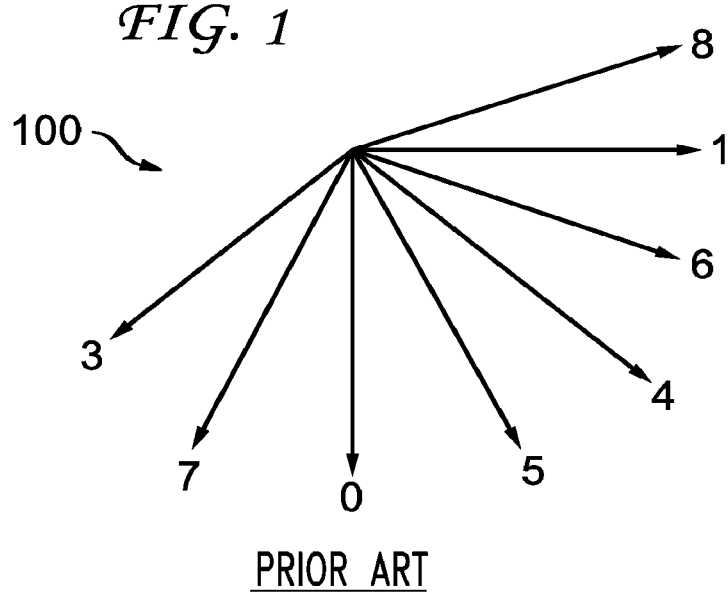
FIG. 1 is a diagram showing INTRA4×4 and INTRA8×8 prediction modes to which the present principles may be applied.
Figure 2:
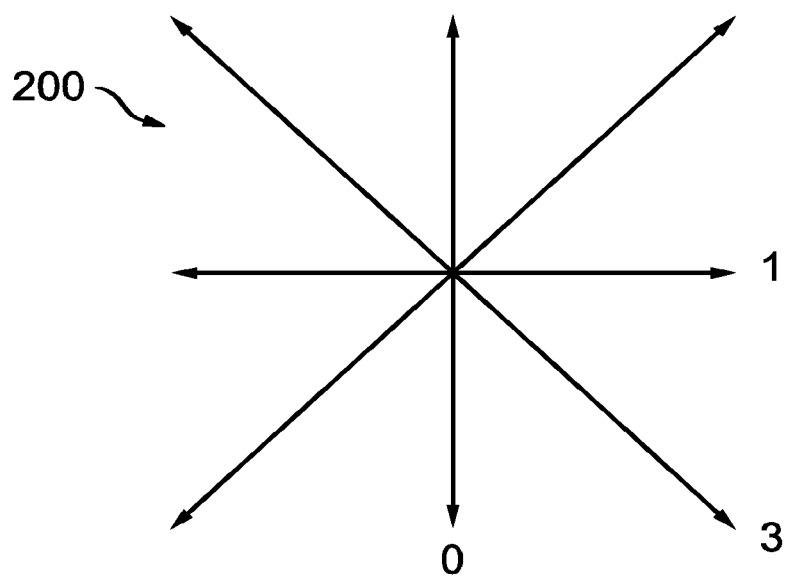
FIG. 2 is a diagram showing INTRA16×16 prediction modes to which the present principles may be applied.
Figure 3:
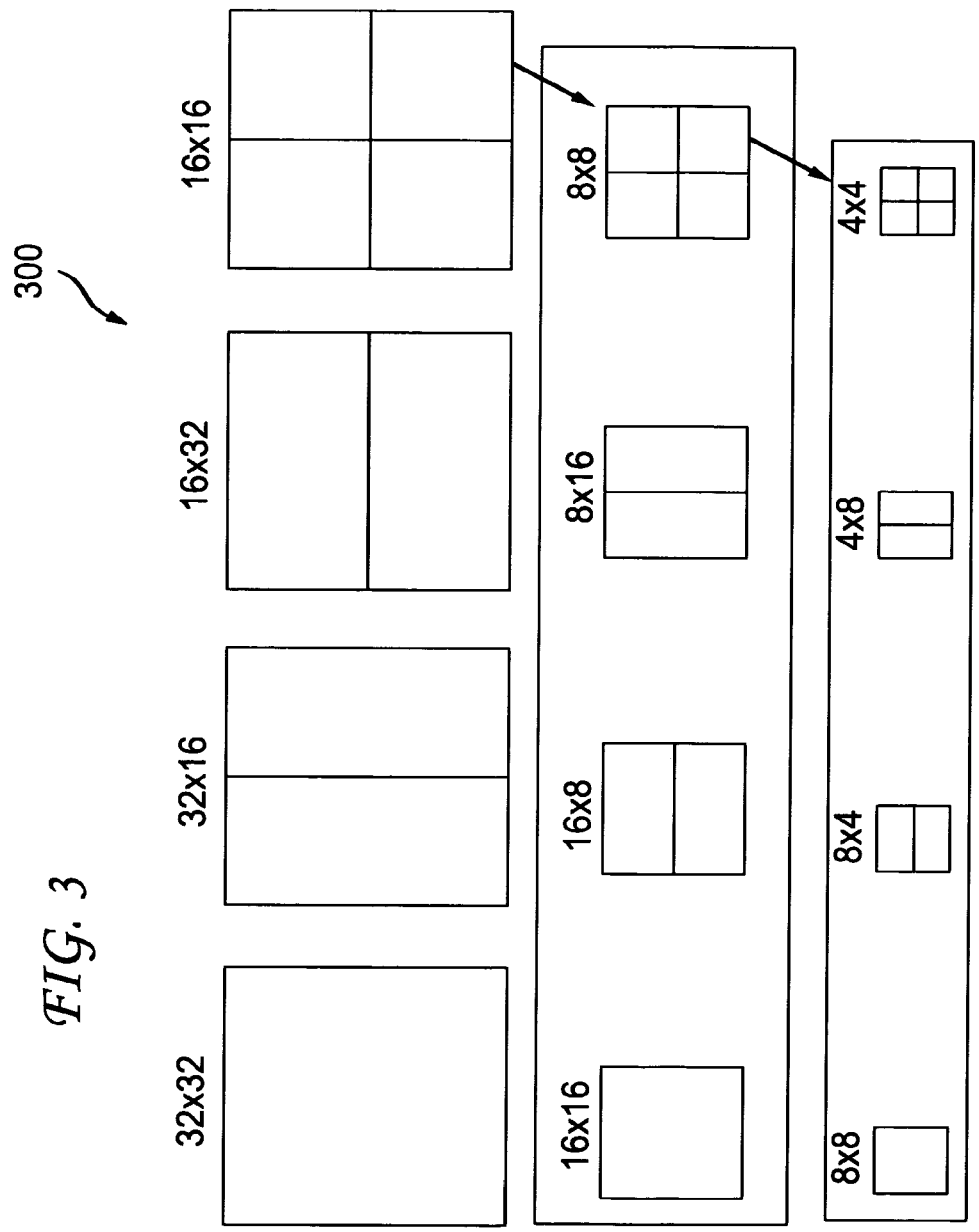
FIG. 3 is a diagram showing motion partitions for use in 32×32 blocks to which the present principles may be applied.

The present principles are directed to methods and apparatus for signaling intra prediction for large blocks for video encoders and decoders.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to an extension of the MPEG-4 AVC standard, the present principles are not limited to solely this extension and/or this standard and, thus, may be utilized with respect to other video coding standards, recommendations, and extensions thereof, while maintaining the spirit of the present principles.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal that intra prediction is designated to be used for a particular large block (as defined herein) in order to make the decoder aware of which particular prediction type (e.g., intra or inter) was used on the encoder side. In this way, the same prediction type may be used at both the encoder side and the decoder side. Thus, for example, an encoder may transmit an indication (i.e., signal) for a particular large block that intra prediction is to be performed on that large block to simply allow the decoder to know and select the same prediction type for that large block. It is to be appreciated that signaling may be accomplished in a variety of ways. For example, one or more syntax elements, flags, and so forth may be used to signal information to a corresponding decoder.

Figure 4:
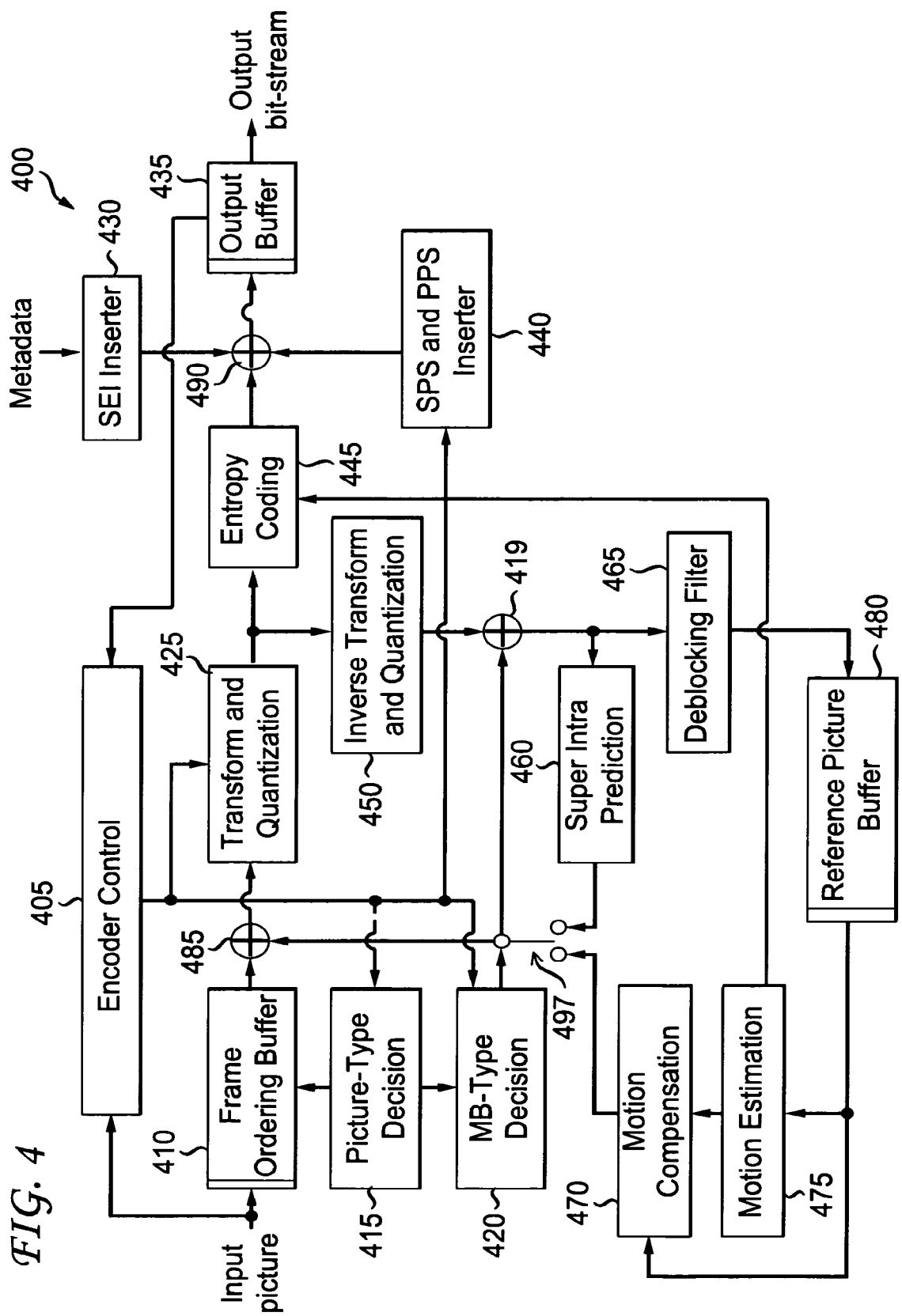
FIG. 4 is a block diagram for an exemplary video encoder to which the present principles may be applied in accordance with an embodiment of the present principles.

Turning to FIG. 4, an exemplary video encoder to which the present principles may be applied in accordance with an embodiment of the present principles is indicated generally by the reference numeral 400.

The video encoder 400 includes a frame ordering buffer 410 having an output in signal communication with a non-inverting input of a combiner 485. An output of the combiner 485 is connected in signal communication with a first input of a transformer and quantizer 425. An output of the transformer and quantizer 425 is connected in signal communication with a first input of an entropy coder 445 and a first input of an inverse transformer and inverse quantizer 450. An output of the entropy coder 445 is connected in signal communication with a first non-inverting input of a combiner 490. An output of the combiner 490 is connected in signal communication with a first input of an output buffer 435.

A first output of an encoder controller 405 is connected in signal communication with a second input of the frame ordering buffer 410, a second input of the inverse transformer and inverse quantizer 450, an input of a picture-type decision module 415, an input of a macroblock-type (MB-type) decision module 420, a second input of a super intra prediction module 460, a second input of a deblocking filter 465, a first input of a motion compensator 470, a first input of a motion estimator 475, and a second input of a reference picture buffer 480.

A second output of the encoder controller 405 is connected in signal communication with a first input of a Supplemental Enhancement Information (SEI) inserter 430, a second input of the transformer and quantizer 425, a second input of the entropy coder 445, a second input of the output buffer 435, and an input of the Sequence Parameter Set (SPS) and Picture Parameter Set (PPS) inserter 440.

A first output of the picture-type decision module 415 is connected in signal communication with a third input of a frame ordering buffer 410. A second output of the picture-type decision module 415 is connected in signal communication with a second input of a macroblock-type decision module 420.

An output of the Sequence Parameter Set (SPS) and Picture Parameter Set (PPS) inserter 440 is connected in signal communication with a third non-inverting input of the combiner 490.

An output of the inverse quantizer and inverse transformer 450 is connected in signal communication with a first non-inverting input of a combiner 419. An output of the combiner 419 is connected in signal communication with a first input of the super intra prediction module 460 and a first input of the deblocking filter 465. An output of the deblocking filter 465 is connected in signal communication with a first input of a reference picture buffer 480. An output of the reference picture buffer 480 is connected in signal communication with a second input of the motion estimator 475. A first output of the motion estimator 475 is connected in signal communication with a second input of the motion compensator 470. A second output of the motion estimator 475 is connected in signal communication with a third input of the entropy coder 445.

An output of the motion compensator 470 is connected in signal communication with a first input of a switch 497. An output of the super intra prediction module 460 is connected in signal communication with a second input of the switch 497. An output of the macroblock-type decision module 420 is connected in signal communication with a third input of the switch 497. The third input of the switch 497 determines whether or not the "data" input of the switch (as compared to the control input, i.e., the third input) is to be provided by the motion compensator 470 or the super intra prediction module 460. The output of the switch 497 is connected in signal communication with a second non-inverting input of the combiner 419 and with an inverting input of the combiner 485.

Inputs of the frame ordering buffer 410 and the encoder controller 405 are available as input of the encoder 400, for receiving an input picture 401. Moreover, an input of the Supplemental Enhancement Information (SEI) inserter 430 is available as an input of the encoder 400, for receiving metadata. An output of the output buffer 435 is available as an output of the encoder 400, for outputting a bitstream.

Figure 5:
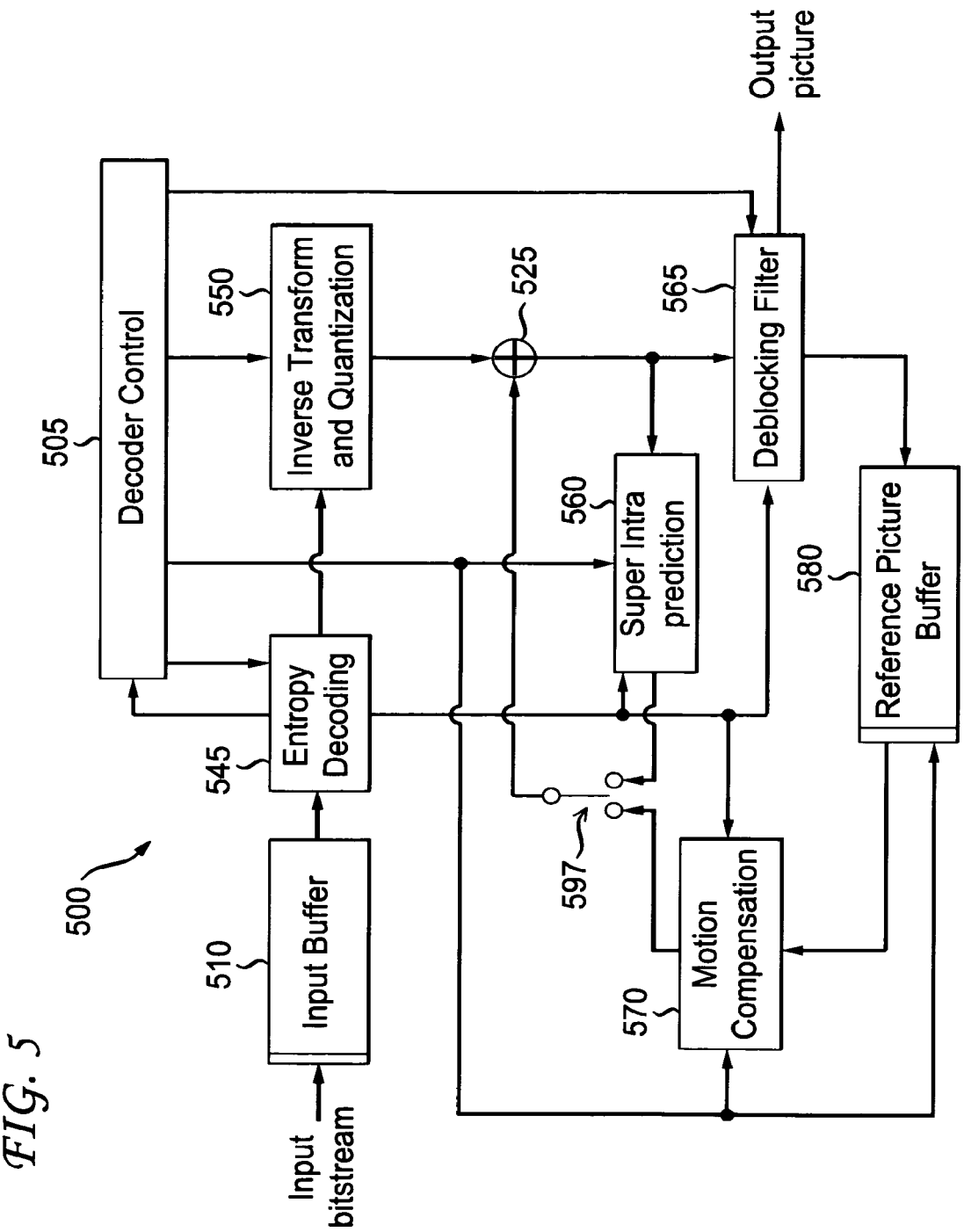
FIG. 5 is a block diagram for an exemplary video decoder to which the present principles may be applied in accordance with an embodiment of the present principles.

Turning to FIG. 5, an exemplary video decoder to which the present principles may be applied in accordance with an embodiment of the present principles is indicated generally by the reference numeral 500.

The video decoder 500 includes an input buffer 510 having an output connected in signal communication with a first input of the entropy decoder 545. A first output of the entropy decoder 545 is connected in signal communication with a first input of an inverse transformer and inverse quantizer 550. An output of the inverse transformer and inverse quantizer 550 is connected in signal communication with a second non-inverting input of a combiner 525. An output of the combiner 525 is connected in signal communication with a second input of a deblocking filter 565 and a first input of a super intra prediction module 560. A second output of the deblocking filter 565 is connected in signal communication with a first input of a reference picture buffer 580. An output of the reference picture buffer 580 is connected in signal communication with a second input of a motion compensator 570.

A second output of the entropy decoder 545 is connected in signal communication with a third input of the motion compensator 570 and a first input of the deblocking filter 565. A third output of the entropy decoder 545 is connected in signal communication with an input of a decoder controller 505. A first output of the decoder controller 505 is connected in signal communication with a second input of the entropy decoder 545. A second output of the decoder controller 505 is connected in signal communication with a second input of the inverse transformer and inverse quantizer 550. A third output of the decoder controller 505 is connected in signal communication with a third input of the deblocking filter 565. A fourth output of the decoder controller 505 is connected in signal communication with a second input of the super intra prediction module 560, with a first input of the motion compensator 570, and with a second input of the reference picture buffer 580.

An output of the motion compensator 570 is connected in signal communication with a first input of a switch 597. An output of the super intra prediction module 560 is connected in signal communication with a second input of the switch 597. An output of the switch 597 is connected in signal communication with a first non-inverting input of the combiner 525.

An input of the input buffer 510 is available as an input of the decoder 500, for receiving an input bitstream. A first output of the deblocking filter 565 is available as an output of the decoder 500, for outputting an output picture.

As noted above, the present principles are directed to methods and apparatus for signaling intra prediction for large blocks for video encoders and decoders. Moreover, as noted above, large blocks, to which the present principles may be applied, are defined to means blocks having a size equal to or larger than 32×32.

In an embodiment, for ease of notation, we split the signaling of intra prediction into the following two parts: sip_type (spatial intra partition type, which can be INTRA4×4, INTRA8×8, INTRA16×16, and so forth); and intra_pred_mode (such as, e.g., the 9 Intra Prediction Modes within INTRA4×4 and INTRA8×8) within each sip_type. In further detail with respect to a particular embodiment, we propose the following three rules for the present principles: (1) select a basic coding unit; (2) allow hierarchical layer intra prediction by either splitting from a largest intra prediction type or merging from the basic coding unit; and (3) for each sip_type, assign a higher priority to the intra_pred_mode which is most frequently used. With respect to Rule (1), we allow several sip_types for the basic coding unit.

An Embodiment

In an embodiment, we set the basic coding unit to be 16×16. In this coding unit, we allow sip_type to be INTRA4×4, INTRA8×8 and INTRA16×16. We also allow hierarchical layer intra prediction as shown in FIG. 6.

Figure 6:
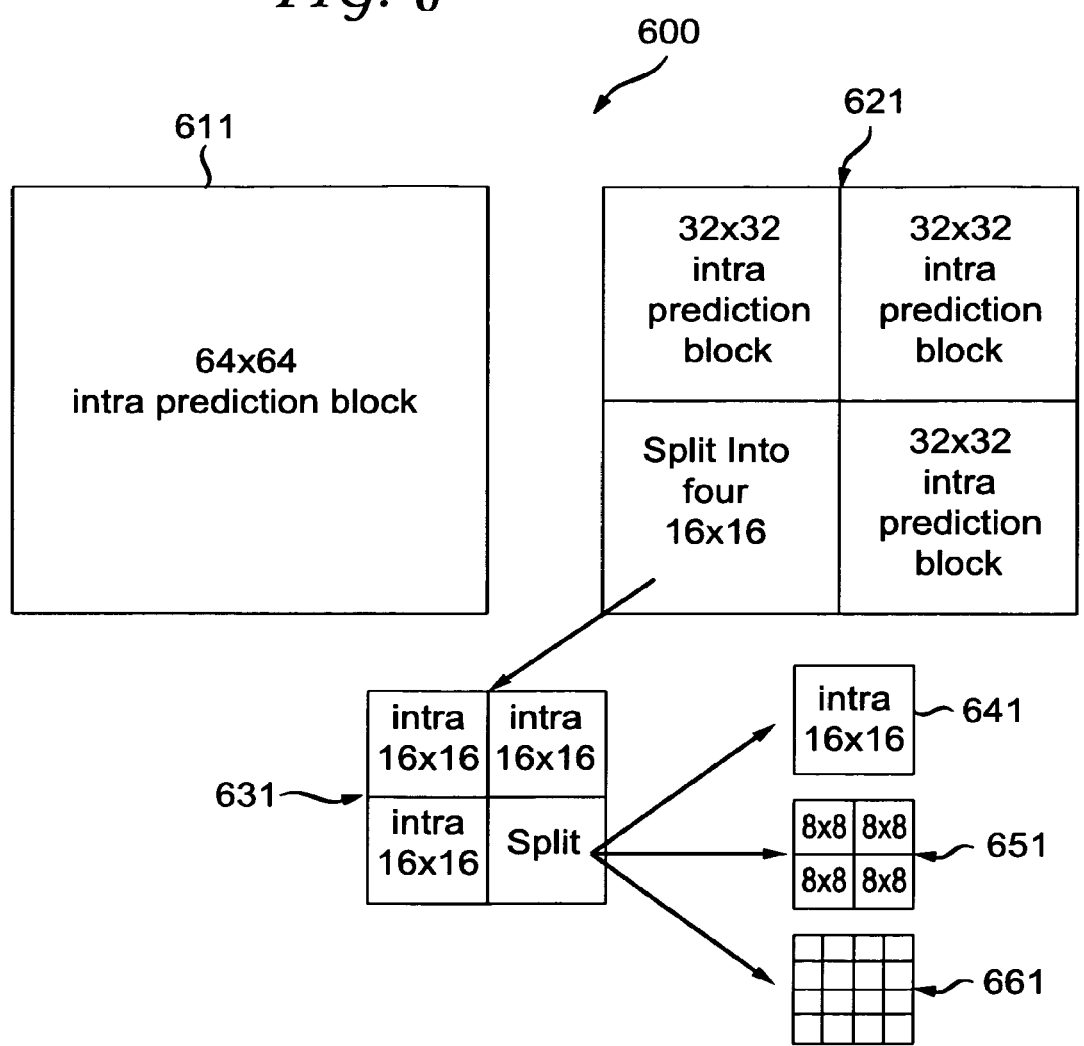
FIG. 6 is a block diagram for exemplary hierarchical partitions to which the present principles may be applied in accordance with an embodiment of the present principles.

Turning to FIG. 6, exemplary hierarchical partitions to which the present principles may be applied are indicated generally by the reference numeral 600. In this embodiment, if the largest block size is set to 64×64, then we use "split signaling" to allow hierarchical layer intra prediction. That is, in an embodiment, we add intra64_flag. If intra64_flag is equal to 1, then INTRA64×64 is used. Otherwise, if intra64_flag is equal to 0, then we split a 64×64 block 611 into four 32×32 blocks 621. For each of the 32×32 blocks 621, we add intra32_flag. If intra32_flag is equal to 1, then INTRA32×32 is used. Otherwise, if intra32_flag is equal to 0, then all sip_types allowed in the 16×16 basic coding unit are allowed here (i.e., for the 32×32 blocks 621) as well. For intra_pred_mode in INTRA16×16, we have DC mode and the directional modes, the latter allowing different types of directional predictions by sending the mode information. Thus, a 32×32 intra prediction block 621 may be further split into 4 16×16 intra prediction blocks 631. One or more of the 4 16×16 intra prediction blocks 631 may be further split to DC mode (not shown), a 16×16 mode 641, an 8×8 mode 651, and a 4×4 mode 661. In this embodiment, we presume having the following four 16×16 intra prediction modes: DC; horizontal (HOR); vertical (VER); and multi-directional (Multi-DIR). The intra_pred_mode is signaled by considering the priority of each mode. In INTRA16×16, since the DC mode is used more often than other modes, we add INTRA16×16_DC in the sip_type table before INTRA16×16. Then we remove the most_probable_mode indication in intra_pred_mode for INTRA16×16. Instead, the other 3 modes (16×16, 8×8, and 4×4) are absolutely indicated.

Syntax

We illustrate an example of syntax for this embodiment in TABLE 2 and TABLE 3. In particular, TABLE 2 shows an exemplary specification of sip_type for a 16×16 coding unit in accordance with an embodiment of the present principles, and TABLE 3 shows exemplary INTRA16×16 prediction modes in accordance with an embodiment of the present principles. For INTRA32×32/INTRA64×64, the same modes as INTRA16×16 are used. For signaling, we replace the most_probable_mode indication with intra32_DC_flag and intra64_DC flag since DC is mostly used. Then we absolutely code other intra_pred_mode.

intra_pred_mode signaling for INTRA4×4 and INTRA8×8 may be performed exactly the same as in the MPEG-4 AVC Standard, so we will not list these modes in any of the tables.

TABLE 2

| Sip_type | Index | Binarization bits |
|---|---|---|
| SIP8×8 | 0 | 0 |
| SIP16×16DC | 1 | 10 |
| SIP16×16 | 2 | 110 |
| SIP4×4 | 3 | 1110 |

TABLE 3

| Intra Prediction Mode | Index | Binarization bits |
|---|---|---|
| VER | 0 | 0 |
| HOR | 1 | 10 |
| Multi-DIR | 2 | 11 |

TABLE 4 shows exemplary macroblock layer syntax, in accordance with an embodiment of the present principles.

TABLE 4

|  | C | Descriptor |
|---|---|---|
| macroblock_layer( ) { | | |
| ... | | |
| intra64_flag | 2 | u(1) |
| if (intra64_flag==1) { | | |
|    intra64_DC_flag | 2 | u(1) |
|    if (intra64_DC_flag==0) { | | |
|       intra_pred_mode_64 | 2 | ue(v)/se(v) |
|       if (intra_pred_mode_64==Multi-DIR) { | | |
|          intra64_multidir_index | 2 | ue(v)/se(v) |
|       } | | |
|    } | | |
| } | | |
| else { | | |
|    for (i32=0; i32<4; i32++) { | | |
|       intra32_flag[i32] | 2 | u(1) |
|       if (intra32_flag[i32]==1) { | | |
|          intra32_DC_flag[i32] | 2 | u(1) |
|          if (intra32_DC_flag[i32]==0) { | | |
|             intra_pred_mode_32[i32] | 2 | ue(v)/se(v) |
|             if (intra_pred_mode_32[i32]==Multi-DIR) { | | |
|                intra32_multidir_index[i32] | 2 | ue(v)/se(v) |
|             } | | |
|          } | | |
|       } | | |
|       else { | | |
|          for (i16=0; i16<4; i16++) { | | |
|             sip_type[i16] | 2 | ue(v)/se(v) |
|             if (sip_type[i16]==SIP16x16) { | | |
|                intra_pred_mode_16[i16] | 2 | ue(v)/se(v) |
|                if (intra_pred_mode_16[i16]==Multi-DIR) { | | |
|                   intra16_multidir_index[i16] | 2 | ue(v)/se(v) |
|                } | | |
|             } | | |
|             else if (sip_type[i16]!=SIP16x16_DC) { | | |
|                mb_intra_prediction_syntax( ); /*this is same as H.264*/ | | |
|             } | | |
|          } | | |
|       } | | |
|    } | | |
| } | | |
| ... | | |
| } | | |

The semantics of some of the syntax elements of TABLE 4 are as follows:

Intra64_flag equal to 1 specifies that INTRA64×64 is used. Intra64_flag equal to 0 specifies that a 64×64 large block is further split into 32×32 partitions.

Intra64_DC_flag equal to 1 specifies that the intra_pred_mode is DC mode for INTRA64×64. Intra64_DC_flag equal to 0 specifies that the intra_pred_mode is not DC mode for INTRA64×64.

intra_pred_mode_64 specifies intra prediction mode (not including DC mode) for INTRA64×64.

intra64_multidir_index specifies the index of the angle for Multi_Dir mode in INTRA64×64.

Intra32_flag [i] equal to 1 specifies that INTRA32×32 is used for the ith 32×32 large block. Intra32_flag [i] equal to 0 specifies that the ith 32×32 large block is further split into 16×16 partitions.

intra32_DC_flag [i] equal to 1 specifies that the intra_pred_mode is DC mode for INTRA32×32 for the ith 32×32 block. intra32_DC_flag[i] equal to 0 specifies that the intra_pred_mode is not DC mode for INTRA32×32 for the ith 32×32 block.

intra_pred_mode_32 [i] specifies the intra prediction mode (not including DC mode) for INTRA32×32 for the ith 32×32 large block.

intra32_multidir_index specifies the index of the angle for Multi_Dir mode in INTRA32×32.

sip_type [i] specifies the spatial intra partition type for the basic block coding unit in the ith 16×16 block.

intra_pred_mode_16 [i] specifies the intra prediction mode (not including DC mode) for INTRA16×16 for the ith 16×16 block.

Intra16_multidir_index specifies the index of the angle for Multi_Dir mode in INTRA16×16 for the ith 16×16 block.

Another Embodiment

In another embodiment, we adaptively select the large block unit to be 32×32 or 64×64. The selection may be signaled using one or more high level syntax elements. In an embodiment, if 32×32 is selected, then we just remove all the syntax related to 64×64.

In another embodiment, hierarchical intra layer prediction can involve merging from basic coding unit. For example, if the largest block unit is 64×64 and the basic coding unit is 16×16, then we use one flag (is_all_16×16_coding) to indicate if all of the 16×16 blocks inside one 64×64 block are of the 16×16 coding type. If is_all_16×16_coding is equal to 1, then this indicates that 16×16 coding type is used and we stop signaling. Otherwise, we use one flag (is_all_32×32_coding) to indicate if all of the 32×32 blocks inside one 64×64 block are of the 32×32 coding type. If is_all_32×32_coding is equal to 1, then this indicates that all of the 32×32 blocks inside one 64×64 block are of the 32×32 coding type. Otherwise, if is_all_32×32_coding and is_all_16×16_coding are equal to 0, then this indicates that INTRA64×64 is used.

In another embodiment, we introduce a sip_type for a block unit (large_sip_type) having a size not less than 16×16. The three types are referred to as follows: large_intra_16×16; large_intra_32×32; and large_intra_64×64. large_intra_16×16 means that all 16×16 blocks inside one large block are of the 16×16 coding type. large_intra_32×32 means that all 32×32 blocks inside one large block are of the 32×32 coding type. In an embodiment, large_intra_32×32 can be combined with the embodiment described above with intra32_flag to allow hierarchical intra prediction. large_intra_64×64 means that all 64×64 blocks inside one large block are coded as INTRA64×64.

In another embodiment, we can introduce several sip/mode tables. The tables can be pre-stored at both an encoder and a decoder, or the tables can be user specified and transmitted using one or more high level syntax elements. TABLE 5 shows exemplary macroblock layer syntax, in accordance with an embodiment of the present principles.

TABLE 5

| macroblock_layer( ) { | C | Descriptor |
|---|---|---|
| ... | | |
| is_all_16×16_coding | 2 | u(1) |
| if (is_all_16×16_coding == 0) { | | |
|   is_all_32×32_coding | 2 | u(1) |
|   if (is_all_32×32_coding == 0) { | | |
|     decode_with_64×64_coding_type( ) | | |
|   } | | |
|   else{ | | |
|     decode_with_32×32_coding_type( ) | | |
|   } | | |
| } | | |
| else { | | |
|   decode_with_16×16_coding_type( ) | | |
| } | | |
| ... | | |
| } | | |

The semantics of the some of the syntax elements of TABLE 5 are as follows:

is_all_16×16_coding equal to 1 specifies that all 16×16 blocks inside a large block are coded by a 16×16 coding type. is_all_16×16_coding equal to 0 specifies that the large block is not coded by a 16×16 coding type.

is_all_32×32_coding equal to 1 specifies that all 32×32 blocks inside a large block are coded by a 32×32 coding type. is_all_32×32_coding equal to 0 specifies that the large block is not coded by a 32×32 coding type.

Figure 7A:
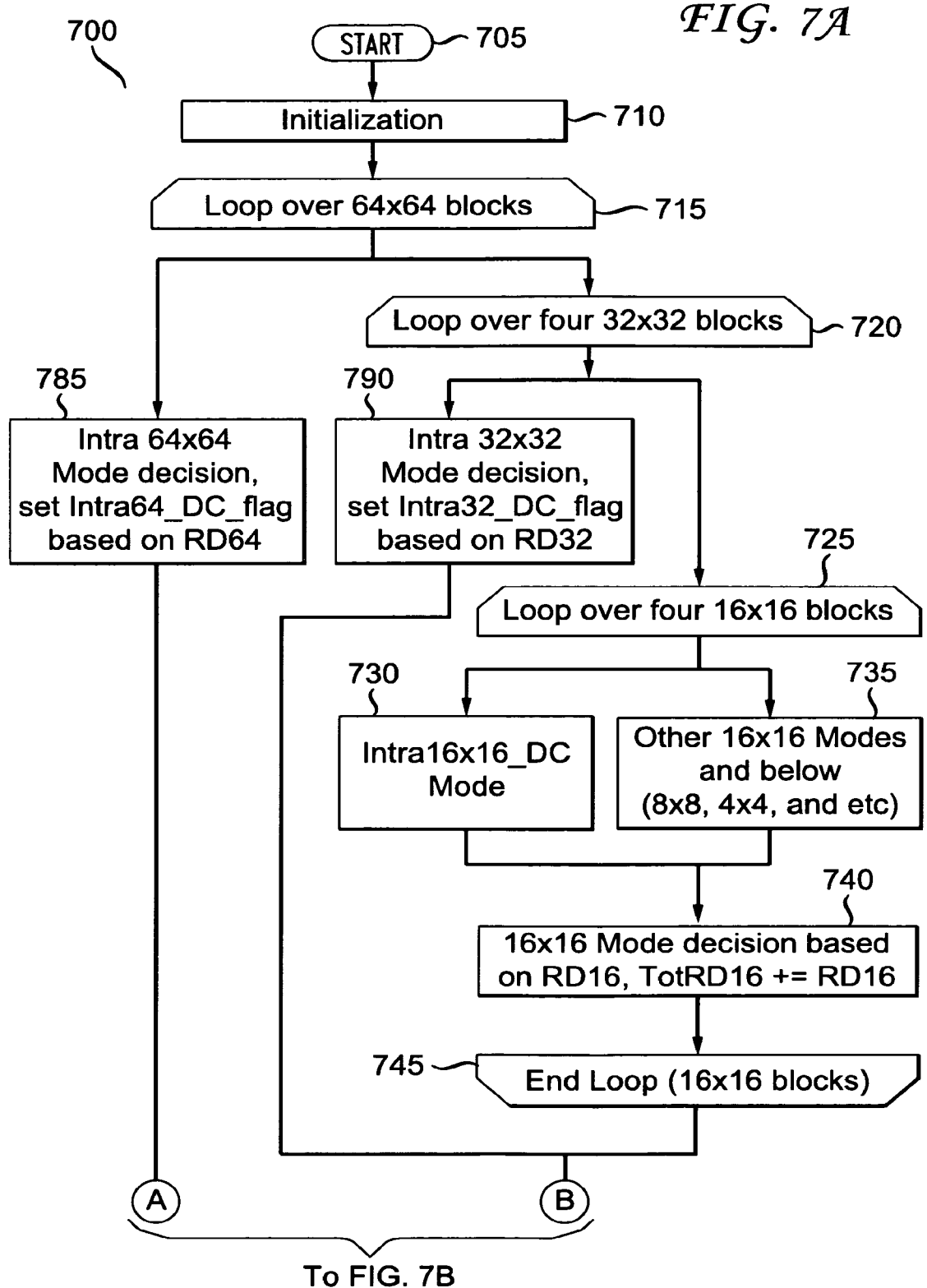

Turning to FIGS. 7A and 7B, which together represent an exemplary method for encoding picture data for large blocks by signaling intra prediction for the large blocks, indicated generally by the reference numeral 700. The method 700 includes a start block 705 that passes control to a function block 710. The function block 710 performs an initialization, and passes control to a loop limit block 715. The loop limit block 715 performs a loop (hereinafter also loop 1) over 64×64 blocks (i.e., blocks having a block size of 64×64), and passes control to a function block 785 and a loop limit block 720.

The function block 785 performs an Intra 64×64 mode decision, sets Intra64_DC flag based on RD64 (i.e., the rate distortion resulting from the Intra 64×64 mode decision), and passes control to a decision block 770.

The loop limit block 720 performs a loop (hereinafter also loop 2) over four 32×32 blocks (i.e., the four blocks having a block size of 32×32 and obtained from the current 64×64 block being processed by loop 1), and passes control to a function block 790 and a loop limit block 725.

The function block 790 performs an Intra 32×32 mode decision, sets Intra32_DC flag based on RD32 (i.e., the rate distortion resulting from the Intra 32×32 mode decision), and passes control to a decision block 750.

The loop limit block 725 performs a loop (hereinafter also loop 3) over four 16×16 blocks (i.e., the four blocks having a block size of 16×16 and obtained from the current 32×32 block being processed by loop 2), and passes control to a function block 730 and a function block 735.

The function block 730 evaluates Intra16×16_DC mode, and passes control to a function block 740. The function block 735 evaluates other 16×16 modes (i.e., other than Intra16×16_DC) and below (e.g., 8×8, 4×4, etc.), and passes control to the function block 740.

The function block 740 performs a 16×16 mode decision based on RD16 (i.e., the rate distortion resulting from the intra 16×16 mode decision), then accumulates the RD16 of each 16×16 block to obtain TotRD16 (which indicates the total rate distortion of the whole 32×32 block when coded by four 16×16 blocks), and passes control to a loop limit block 745. The loop limit block 745 ends the loop (i.e., loop 3) over the 16×16 blocks, and passes control to the decision block 750.

The decision block 750 determines whether or not RD32<TotRD16 (i.e., whether the rate distortion cost for a current 32×32 block is less than the total rate distortion cost for the four 16×16 blocks obtained from the current 32×32 block). If so, then control is passed to a function block 755. Otherwise, control is passed to a function block 742.

The function block 755 sets Intra32_flag equal to one, and passes control to a function block 760. The function block 742 sets Intra32_flag equal to zero, and passes control to the function block 760.

The function block 760 sets an accumulation of the RD32 of each 32×32 block to TotRD32 to indicate the total rate distortion of the whole 64×64 block when coded by four 32×32 blocks, and passes control to a loop limit block 765. The loop limit block 765 ends the loop (i.e., loop 2) over the 32×32 blocks, and passes control to a decision block 770.

The decision block 770 determines whether or not RD64<TotRD32 (i.e., whether the rate distortion cost for a current 64×64 block is less than the total rate distortion cost for the four 32×32 blocks obtained from the current 64×64 block). If so, then control is passed to a function block 775. Otherwise, control is passed to a function block 780.

The function block 775 sets Intra64_flag equal to one, and passes control to a loop limit block 795. The function block 780 sets Intra64_flag equal to zero, and passes control to the function block 795.

The function block 795 ends the loop (i.e., loop 1) over the 64×64 blocks, and passes control to a function block 797. The function block 797 entropy codes flags, intra_pred_mode, and a residue, and passes control to an end block 799.

Figure 8A:
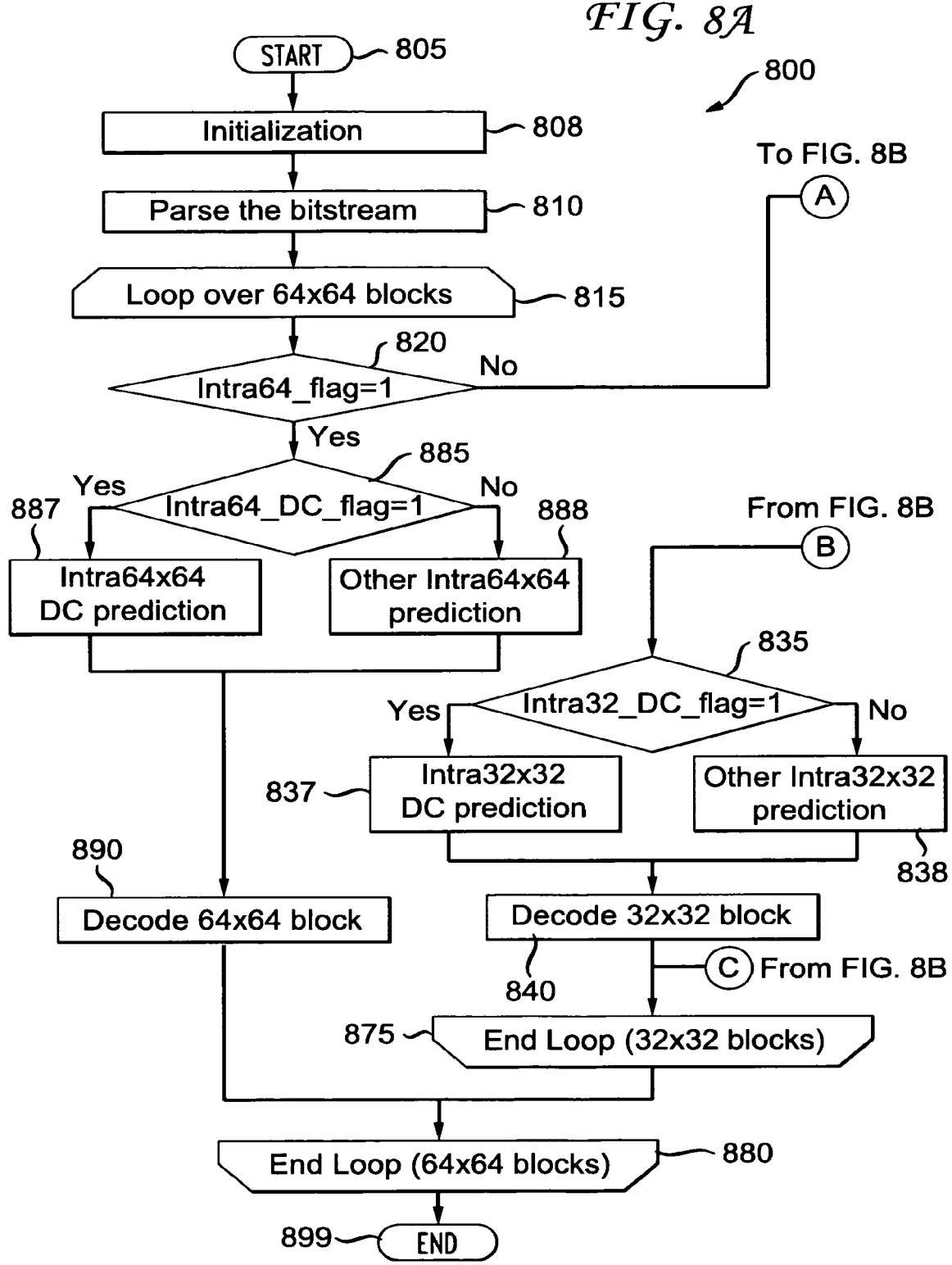

Turning to FIGS. 8A and 8B, which together represent an exemplary method for decoding picture data for large blocks by determining that intra prediction is to be applied to the large blocks, indicated generally by the reference numeral 800. The method 800 includes a start block 805 that passes control to a function block 808. The function block 808 initializes the decoder and then passes the control to a function block 810. The function block 810 parses the bitstream, and passes control to a loop limit block 815. The loop limit block 815 performs a loop (hereinafter loop 1) over 64×64 blocks, and passes control to a decision block 820. The decision block 820 determines whether or not Intra64_flag is set equal to one. If so ("Yes"), then control is passed to a function block 885. Otherwise ("No"), control is passed to a loop limit block 825.

The function block 885 determines whether or not intra64_DC_flag is set equal to one. If so ("Yes"), then control is passed to a function block 887. Otherwise ("No"), control is passed to a function block 888. The function block 887 performs intra 64×64 DC prediction, and then passes control to a function block 890. The function block 888 performs intra 64×64 predictions other than intra 64×64 DC mode and then passes control to a function block 890. The function block 890 decodes a current 64×64 block, and passes control to a loop limit block 880. The loop limit block 880 ends the loop (i.e., loop 1) over the 64×64 blocks, and passes control to an end block 899.

The loop limit block 825 performs a loop (hereinafter loop 2) over four 32×32 blocks, and passes control to a decision block 830. The decision block 830 determines whether or not Intra32_flag is equal to one. If so ("Yes"), then control is passed to a function block 835. Otherwise ("No"), control is passed to a loop limit block 845.

The function block 835 determines whether or not Intra32_DC_flag is equal to one. If so ("Yes"), then control is passed to a function block 837. Otherwise ("No"), control is passed to a function block 838. The function block 837 performs an intra32×32 DC prediction, and passes control to a function block 840. The function block 838 performs an intra prediction other than intra 32×32 DC mode, and then passed the control to the function block 840. The function block 840 decodes a 32×32 block, and passes control to a loop limit block 875.

The loop limit block 875 ends the loop (i.e., loop 2) over the 32×32 blocks, and passes control to the loop limit block 880.

The loop limit block 845 performs a loop (hereinafter loop 3) over four 16×16 blocks, and passes control to a decision block 850. The decision block 850 determines whether or not sip_type=Intra16_DC. If so ("Yes"), then control is passed to a function block 855. Otherwise ("No"), control is passed to a function block 860.

The function block 855 performs Intra16×16_DC mode prediction, and passes control to a function block 865. The function block 860 performs mode prediction using other intra prediction modes (i.e., other than Intra16×16_DC mode), and passes control to the function block 865.

The function block 865 decodes a 16×16 block, and passes control to a loop limit block 870. The loop limit block 870 ends the loop (i.e., loop 3) over the 16×16 blocks, and passes control to the loop limit block 875.

A description will now be given of some of the many attendant advantages/features of the present invention, some of which have been mentioned above. For example, one advantage/feature is an apparatus having a video encoder for encoding picture data for at least one large block in a picture by signaling intra prediction for the at least one large block. The intra prediction is signaled by selecting a basic coding unit size and assigning a single spatial intra partition type for the basic coding unit size. The single spatial intra partition type is selectable from among a plurality of spatial intra partition types. The at least one large block has a large block size greater than a block size of the basic coding unit. The intra prediction is hierarchical layer intra prediction and is performed for the at least one large block by at least one of splitting from the large block size to the basic coding unit size and merging from the basic coding unit size to the large block size.

Another advantage/feature is the apparatus having the video encoder as described above, wherein for each of the plurality of spatial intra partition types, a higher priority is assigned to a particular intra prediction mode that is most frequently used from among a plurality of available intra prediction modes.

Yet another advantage/feature is the apparatus having the video encoder as described above, wherein the large block size is adaptively selected.

Still another advantage/feature is the apparatus having the video encoder as described above, wherein the signaling is performed using one or more high level syntax elements.

Moreover, another advantage/feature is the apparatus having the video encoder as described above, wherein at least one of a spatial intra partition type table and an intra prediction mode table is pre-stored and used by the video encoder to encode the at least one large block. The at least one of the spatial intra partition type table and the intra prediction mode table is arranged to be pre-stored and used by a corresponding video decoder to decode the at least one large block.

Further, another advantage/feature is the apparatus having the video encoder as described above, wherein at least one of a spatial intra partition type table and an intra prediction mode table, is used by the video encoder to encode the at least one large block, and is transmitted by the video encoder using one or more high level syntax elements.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A video decoder, comprising at least a memory and one or more processors, wherein the one or more processors are configured to:
  decode picture data for at least a large block in a picture by determining that intra prediction is to be performed for the at least a large block, wherein the at least a large block has a large block size greater than a basic coding unit size, the large block size being one of 32×32 and 64×64 and the basic coding unit size being 16×16, wherein the intra prediction is signaled for the at least a large block and the one or more processors are configured to:
  decode a binary split signaling syntax element specifying whether the large block is further split into four equally sized sub-blocks;
  decode an intra prediction mode for said large block in the case where said binary split signaling syntax element specifies the large block is not further split;
  otherwise in the case where said binary split signaling syntax element specifies the large block is further split:
  decode for each sub-block, in the case where said sub-block is 32×32, a binary split signaling syntax element specifying whether said 32×32 sub-block is further split into four equally basic coding unit sized blocks and decode an intra prediction mode for said 32×32 sub-block in the case where said binary split signaling syntax element specifies said 32×32 sub-block is not further split; and
  decode for each sub-block, in the case where said sub-block is 16×16, a single spatial intra partition type, the single spatial intra partition type being determinable from among a plurality of spatial intra partition types, wherein the single spatial intra partition type selected from the plurality of spatial intra partition types is accompanied by at least (1) a single intra prediction type for the basic coding unit size which does not use a most probable intra prediction mode and (2) a single intra prediction type indicating the most probable intra prediction mode for the basic coding unit size.

2. The video decoder of claim 1, wherein at least one of a spatial intra partition type table and an intra prediction mode table is pre-stored and used to decode the at least one large block.

3. The video decoder of claim 1, wherein at least one of a spatial intra partition type table and an intra prediction mode table is received using one or more high level syntax elements and is used to decode the at least one large block.

4. A video encoder, comprising at least a memory and one or more processors, wherein the one or more processors are configured to:
  encode picture data for at least a large block in a picture by determining that intra prediction is to be performed for the at least a large block, wherein the at least a large block has a large block size greater than a basic coding unit size, the large block size being one of 32×32 and 64×64 and the basic coding unit size being 16×16, wherein the intra prediction is signaled for the at least a large block and the one or more processors are configured to:
  encode a binary split signaling syntax element specifying whether the large block is further split into four equally sized sub-blocks;
  encode an intra prediction mode for said large block in the case where said binary split signaling syntax element specifies the large block is not further split;
  otherwise in the case where said binary split signaling syntax element specifies the large block is further split:
  encode for each sub-block, in the case where said sub-block is 32×32, a binary split signaling syntax element specifying whether said 32×32 sub-block is further split into four equally basic coding unit sized blocks and encode an intra prediction mode for said 32×32 sub-block in the case where said binary split signaling syntax element specifies said 32×32 sub-block is not further split; and
  encode for each sub-block, in the case where said sub-block is 16×16, a single spatial intra partition type, the single spatial intra partition type being determinable from among a plurality of spatial intra partition types, wherein the single spatial intra partition type selected from the plurality of spatial intra partition types is accompanied by at least (1) a single intra prediction type for the basic coding unit size which does not use a most probable intra prediction mode and (2) a single intra prediction type indicating the most probable intra prediction mode for the basic coding unit size.

5. The video encoder of claim 4, wherein at least one of a spatial intra partition type table and an intra prediction mode table is pre-stored and used to encode the at least one large block.

6. The video encoder of claim 4, wherein at least one of a spatial intra partition type table and an intra prediction mode table is encoded using one or more high level syntax elements and is used to encode the at least one large block.

* * * * *